June 17, 1958     H. L. FORGAARD     2,839,115
CONE-GRIP, DISTORTED THREAD LOCK-NUT
Filed June 9, 1955
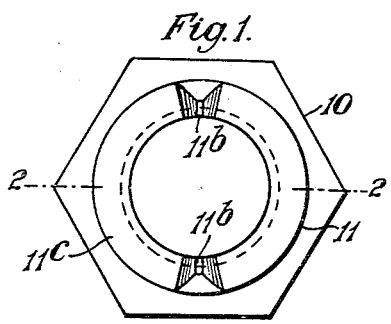
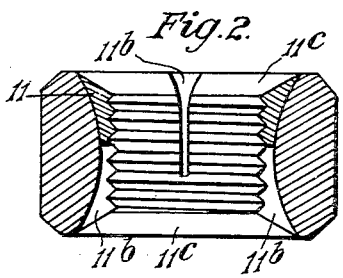
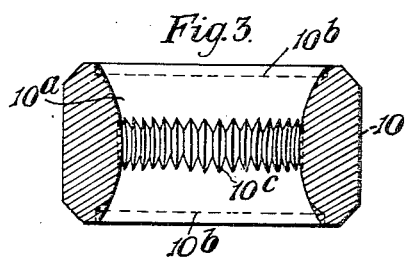
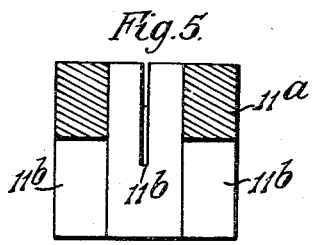
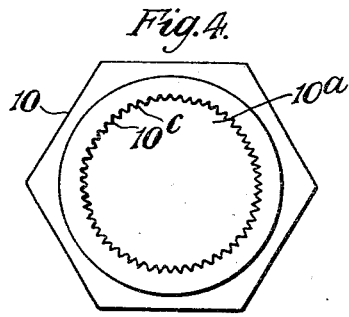
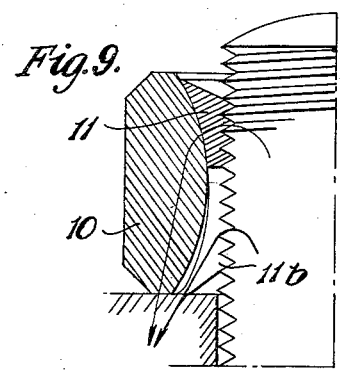
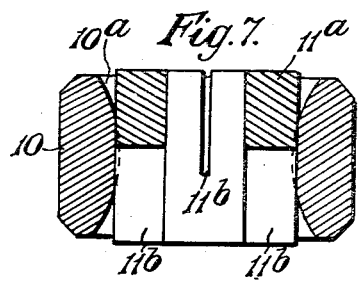
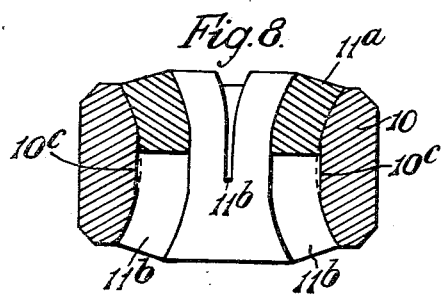
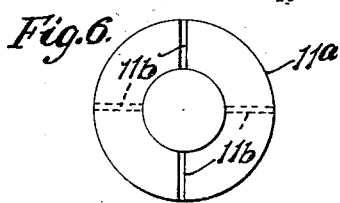
INVENTOR
Harcourt L. Forgaard
By Mamis & Bateman
ATTORNEYS United States Patent Office 2,839,115
Patented June 17, 1958

2,839,115

CONE-GRIP, DISTORTED THREAD LOCK-NUT

Harcourt Lester Forgaard, Hagley, England

Application June 9, 1955, Serial No. 514,159

3 Claims. (Cl. 151—19)

My invention relates to lock-nuts, that is to say, to the devices used in conjunction with screw-pins and screw bolts for effecting connections between the component parts of machines and for analogous purposes.

The invention has for its object the provision of a lock-nut which has an improved locking action and which will eliminate, or substantially reduce, the fatigue failure of bolted connections.

A lock nut in accordance with the invention comprises a main body having an axial unthreaded bore the diameter of which increases gradually from the portion of the bore mid-way or substantially mid-way, between the ends out to each end thereof and a separately formed tubular bush of axial length substantially equal to that of the main body disposed nonrotatably within said bore and having its outer peripheral surface conforming to the interior surface of the bore in the main body, the interior of the bush being screw-threaded for engagement with the screw thread on a bolt, said bush having at least one end face thereof of dished formation which provides an annular recess surrounding the opening in the end of the bush and said bush having at each end one or more, slits to permit radial expansion or contraction thereof whereby when the nut is tightened upon a bolt against an abutment with the dished end face of the bush adjacent the abutment, the bush will be displaced axially relatively to the body of the nut, the half of the bush remote from the abutment being drawn into wedging engagement between the interior surface of the main body and the bolt shank and the other half of the bush being forced away from the interior surface of the main body and towards the bolt shank while the undersurface of the end of this half of the bush is forced hard against the abutment so that the load on the bush caused by the tensile stress generated in the bolt shank is transmitted to the abutment partly from the first mentioned half of the bush through the main body of the nut and partly from the other half of the bush through direct contact with the abutment thereby affording a substantially uniform distribution of the load over the engaged threads of the bolt.

My invention will be further and more particularly described with reference to the accompanying drawing, wherein:

Figure 1 is a plan view of the nut.

Figure 2 is a sectional view in side elevation on the plane indicated by the dotted line 2—2, Figure 1.

Figure 3 is a similar view to Figure 2 of the main body portion of the nut before the assembly and fixing therein of the portion herein referred to as the internal bush.

Figure 4 is a plan view of the said main body.

Figure 5 represents in sectional elevation, and in a partially formed condition, a tubular member employed in the formation of the internal bush incorporated in the main body of the nut in accordance with my invention.

Figure 6 represents the said member in plan.

Figures 7 and 8 illustrate two stages in the operations performed in the production of the finished lock-nut.

Figure 9 is an enlarged view in section, showing the condition attained when the nut is fully tightened on a bolt.

The same numerals of reference indicate the same parts in the several figures of the drawings.

In the embodiment of my invention illustrated the main body of the nut is denoted generally by the reference 10 and the internal bush incorporated therein is denoted generally by the reference 11.

The main body 10 of the nut which may be of square or hexagonal form or any other shape generally used for nuts, or it may be of cylindrical form the periphery being ribbed or provided with tommy holes to facilitates the use of spanners.

The said main body 10, which may be made of any suitable material for example either steel or a non-ferrous metal is formed or furnished with an axial bore $10^a$ the periphery of which is of smallest diameter on the middle horizontal plane through the axis of the body and increases gradually in diameter on each side or face of the said plane to its termination on the respective faces of the body so that each part or half of the said bore $10^a$ has a bell formation.

The respective end faces of the main body 10 may have a shallow annular recess formed therein as indicated by the dotted lines marked $10^b$ in Figure 3 and wherein the ends of the bore $10^a$ terminate.

A narrow band of vertical serrations, marked $10^c$, is, or may be, formed by a serrating or forging or forming tool, at the middle or waist portion of the bore $10^a$ in the main body 10 for the purpose hereinafter referred to.

The internal bush 11 provided in association with the main body 10 may be made from a piece of cylindrical tubing of steel or a non-ferrous metal or other substance such as a suitable synthetic plastic, and which may have a factor of hardness different from that of the main body 10 of the nut, the said tubular piece which is marked $11^a$ where shown in the partly fabricated condition, having an external diameter such that when it is inserted in the bore $10^a$ in the main body it has a tight fit in the waist portion thereof, the serrations $10^c$ in the waist in the bore $10^a$ serving to prevent rotation of the main body and bush relative to each other.

The length of the piece of cylindrical tube $11^a$ which is inserted in the bore $10^a$ in the main body 10 for the formation therein of the internal bush 11 may be somewhat greater than the thickness or depth of the said main body of the nut so that when it is inserted in the bore $10^a$ in the said main part the respective ends of the said cylindrical tube project slightly from the corresponding faces of the body of the nut as seen in Figure 7.

The said bush forming tube $11^a$ which is represented separate from the main body, in sectional elevation and plan in Figures 5 and 6 respectively, is, before its insertion into the bore $10^a$ of the main body 10 of the nut, provided with a series of vertical slits marked $11^b$ preferably equally spaced apart around the body of the tube, the slits which extend into the tube from one end thereof being disposed in different vertical radial planes from those extending into the tube from its other end, the said slits, if desired, having a length such that their inner ends overlap.

Where two such slits are provided in the upper and lower part or half of the tube the slits in the one part or half will preferably be disposed in a diametrical plane at right angles to the diametrical plane in which the slits in the other part are provided, as will be best appreciated by reference to Figure 6, but they may be otherwise disposed and furthermore, there may be more than two slits provided in each part of the tube, if desired.

When the said bush forming tube has been properly inserted in the bore 10ª of the main body 10 the tube is, by the use of an appropriate forming tool, so expended that it is brought into contact and conformity with adjoining parts of the internal periphery of the said bore in the main body, the respective end portions of the bush being thus given the flared formation shown in Figure 8 of the drawing.

Where the main body 10 is provided with the shallow annular recess 10ᵇ hereinbefore referred to in its respective end faces the outer edge of the ends of the bush forming tube will be brought into these recesses by the expanding operation on the said ends.

The slits 11ᵇ provided in the bush 11 permit diametrical contraction of the threaded bore in the tightening up operation on the nut, and diametrical expansion of the threaded bore when unscrewing the nut.

The respective ends of the bush are given a conical or dished formation, as seen in Figure 2, and marked 11ᶜ, by a machining or forming operation, so as to provide an annular recess surrounding the opening in each end of the bush.

Subsequent to the performance of the expanding and forming operations on the respective ends of the bush forming tube, the said tube is drilled and tapped.

Any form of screw thread may be provided in the nut.

When an ordinary solid nut is tightened on a bolt with the underside of the nut bearing against some rigid abutment with which the bolt is associated, the shank of the bolt between the underside of the nut and the bolt head is put under tension, and the more the nut is tightened the greater is the tensile stress in this portion of the bolt shank. Because of this the thread of the nut does not bear against both flanks of the bolt thread but only against one. It is the flank of the nut thread which is furthest from the abutment which bears against the flank of the bolt thread which is nearest the abutment. There can thus be frictional resistance to turning over not more than 50% of the opposed thread surfaces, given ideal conditions, and in most cases it is much less than 50%.

Also it has been established that the loading on the threads of an ordinary solid nut and bolt is not distributed evenly over the axial length of the nut and the portion of the bolt thread which is engaged. A great percentage of the total load is transmitted through the first engaged thread and gradually less in the following threads in an ordinary solid nut and this non-uniform load distribution is an important cause of fatigue failure in bolts and a large proportion of such failure takes place on the first engaged thread.

It will be appreciated that when a nut in accordance with this invention is applied to a screw pin or bolt and either of its ends is tightened up against an abutment constituted by a part of a machine or other structure in conjunction with which the pin or bolt is employed, the screw threads in the bush will first engage the underside of the threads of the pin or bolt but on continuance of the tightening up operation the bush will move axially (relatively to the main body) towards the abutment, and the alternate position attained is illustrated in Figure 9.

This axial movement of the bush causes the top half thereof to move inwardly toward the axis of the bolt with a wedging action, due to the convex bell formation of the top half of the main body interior, and forces the threads of the top half of the bush into hard engagement with both flanks of the bolt thread. At the same time, because of this axial movement of the bush, the bottom half thereof has moved out of engagement with the convex bell formation of the bottom half of the main body, and as the under face of the lower end of the bush is in contact with the abutment, pressure is built-up between this end and the abutment so that the lower peripheral edge of the bush tends to expand or splay outwards, but as this cannot take place because of the restraint offered by the main body, the lower half of the bush will act after the manner of a strut under vertical axial load and will distort or bow inwardly, thus forcing its threads into hard engagement with both flanks of the bolt thread. Some flatening of the underface of the lower end of the bush will take place, while the lower peripheral edge is forced hard against the interior of the main body.

There is thus a certain amount of deformation of the bush in itself inasmuch as the lower half moves relatively to the upper half and this can take place because of the elasticity of the thin waist portion of the bush at the center thereof.

Any variation in pitch in bolt and nut threads will be accommodated and adjusted by the thin waist at the centre part of the bush which joins the bottom and top half of the threaded bush, and which will stretch or compress accordingly.

When fully tightened the thread of the nut makes full contact over both flanks of the bolt thread and is wedged into hard engagement therewith to achieve the locking action of the nut. This tends towards a more uniform distribution of the load over the bolt thread which is engaged but a more important aspect of the invention can be seen by referring to Figure 9, where it will be observed that the load on the bush due to the tensile stress in the bolt shank is divided into two parts, one part being transmitted through the body of the nut from the upper part of the bush to the abutment, and the other part being transmitted directly to the abutment from the lower half of the bush (as shown by the arrows). Thus the load on the bolt thread is divided into two parts, one of which is in the region of the upper half of the engaged thread and the other of which is in the region of the lower half of the engaged thread so that the resultant loading on the bolt thread is more evenly and elastically distributed and this eliminates, or substantially reduces, the major cause of bolt fatigue falure. As compared with a solid nut, the present invention provides a nut which has considerable elasticity and is thus better able to transmit vibrations between the abutment and the bolt. When tightened, the bottom half of the bush acts after the fashion of a bowed spring strut under compression, and this provides an elastic connection between the lower half of the engaged thread and the abutment, while the upper half of the bush also acts to some extent as an elastic medium between the upper half of the bolt thread and the nut body so that there is no rigid connection between this half of the bolt thread and the abutment such as there is with a conventional solid nut.

It will be appreciated that the nut of the present invention is capable of being used in both directions. After it has been used one way up and the bush has been displaced, the nut can be inverted and used again whereupon the bush will be displaced in the opposite direction to achieve the same effects as with the first use. This process of inversion may be repeated until such time as the bush shows signs of permanent set.

I wish it to be understood that I do not limit myself to the precise details of construction described as the same may be varied without departing from the invention.

For example, instead of providing a series of vertical serrations such as 10ᶜ in the waist portion of the bore of the main body these may be dispensed with and the tube which forms the internal bush may be furnished on its outer periphery with vertical serrations which serve the same purpose; or both the bore in the main body 10 and the outer periphery of the bush 11 may be formed with serrations adapted for an interlocking engagement.

I claim:

1. A lock-nut comprising a main body having an axial unthreaded bore the diameter of which increases gradually from the portion of the bore midway between its ends out to each end thereof, and a separately formed tubular bush of axial length substantially equal to that of the main body disposed within said bore and having its outer peripheral surface conforming to the interior surface of the bore in the main body, the interior of the bush being screw-threaded for engagement with the screw thread on the shank of a bolt, said bush having at least one end face thereof of dished formation which provides an annular recess surrounding the opening in the end of the bush and said bush having at each end at least one slit to permit radial expansion or contraction thereof, cooperating means on the bush and on the main body for preventing relative rotation therebetween, the bush being displaceable axially relatively to the body of the nut, by tightening of the nut on a bolt against an abutment with the dished end face of the bush adjacent the abutment, to draw the half of the bush remote from the abutment into wedging engagement between the interior surface of the main body of the nut and the bolt shank and force the other half of the bush away from the interior surface of the main body and towards the bolt shank while the underface of the end of this half of the bush is forced firmly against the abutment so that the load on the bush caused by the tensile stress generated in the bolt shank is transmitted to the abutment partly from the first-mentioned half of the bush through the main body of the nut and partly from the other half of the bush through direct contact with the abutment.

2. A lock-nut according to claim 1, wherein said main body of the nut is provided with serrations on its interior surface at the region thereof of minimum diameter, and said bush has binding engagement with said serrations.

3. A lock-nut according to claim 1, wherein said bush is provided with equally spaced axially directed slits at each end, the inner ends of said slits overlapping at the center of the bush.

References Cited in the file of this patent

UNITED STATES PATENTS

| | | |
|---|---|---|
| 148,646 | Atwood | Mar. 17, 1874 |
| 1,734,445 | Place | Nov. 5, 1929 |
| 2,402,583 | Schumacher | June 25, 1946 |
| 2,546,332 | Costello | Mar. 27, 1951 |
| 2,581,641 | Forgaard | Jan. 8, 1952 |

FOREIGN PATENTS

| | | |
|---|---|---|
| 6,152 | Australia | Feb. 25, 1927 |